June 10, 1924.

O. PUSINO 1,497,027

APPARATUS FOR LAYING ASIDE TYPES PROVIDED WITH SLOTS ON RULES

Filed May 17, 1922

Inventor:
OREST PUSINO.
by Emery, Booth,
Janney & Varney
ATTYS.

Patented June 10, 1924.

1,497,027

UNITED STATES PATENT OFFICE.

OREST PUSINO, OF CHARLOTTENBURG, GERMANY.

APPARATUS FOR LAYING ASIDE TYPES PROVIDED WITH SLOTS ON RULES.

Application filed May 17, 1922. Serial No. 561,633.

*To all whom it may concern:*

Be it known that I, OREST PUSINO, citizen of Finland, and resident of Charlottenburg, Germany, have invented an Improvement in Apparatus for Laying Aside Types Provided with Slots on Rules, of which the following description is a specification, like characters on the drawings representing like parts.

This invention relates to an apparatus for laying aside types provided with slots on rules, which is characterized by the fact that some rectilinear parts of the rules are displaced aside by touching keys and are replaced by curved parts for guiding the types to their deposits.

Figure 1:
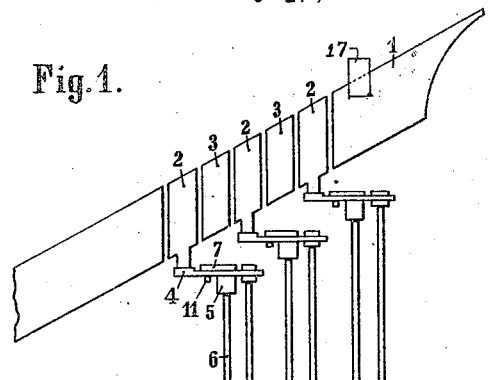
Figure 2:
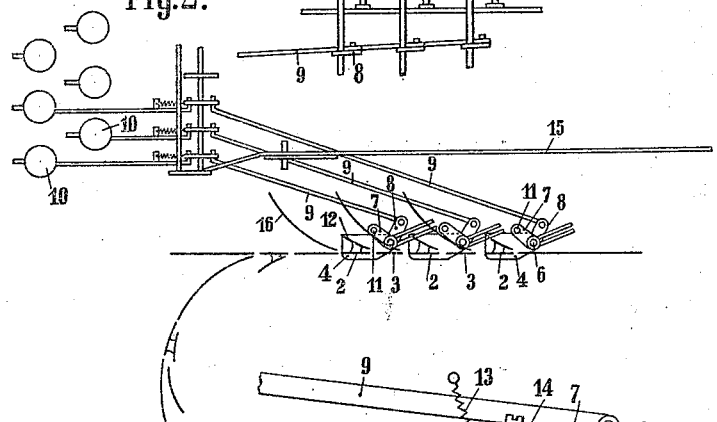
Figure 3:
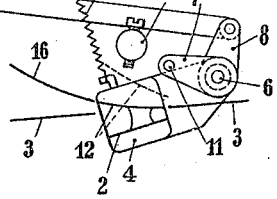
Figure 4:
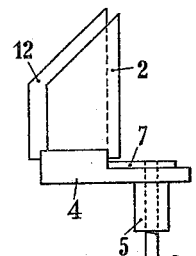

The object of the invention is illustrated in the drawing in one form of execution. Fig. 1 shows that part of a machine for laying aside types which is important for the invention; Fig. 2 shows a plan view relating to Fig. 1; Fig. 3 shows the new apparatus in a plan view; Fig. 4 shows a front view relating to Fig. 3; the latter figures are designed in an enlarged scale.

After printing is finished the types are put on a rule in any series, as desired, and are conducted to an inclined knife 1 formed wire like in its part connected to the disc which does not belong to the invention. This knife is enlarged in its lower part. This lower part supports the small pieces 2, 3 forming a continued knife in their motionless position. Each plate 2 is fixed on a lever 4 pivoting about a hollow axle 5. Through this hollow axle 5 extends an axle 6 downwardly. On the upper end the axle is provided with a lever 7 and on the lower end it supports a lever 8. This lever 8 is connected to a key 10 by means of a bar 9 whilst the lever 7 possesses a downward directed pin 11. The lever 4 is led by a spring 13 to the adjusting screw 14 in its stillstand position.

The lever 4 is connected to the bar 15 by means of a not illustrated stoppage gearing. The guiding rule 16 serves for depositing the types to the chosen deposit. The bar 15 serves to connect the normal dividing mechanism (not shown in the drawing) to an axle which can be moved by any of the keys.

The operation of the apparatus is as follows:

The type, one of which is shown in Fig. 1 at 17, is separated in a known manner and slides downwardly upon the knife 1. In the same moment the corresponding lever 4 is rotated by means of the bar 9, the lever 8, the axle 6 and the lever 7 with the pin 11 about such an angle, that the curved plate 12 is put in the direction of the knife 16.

What I claim as new and desire to secure by Letters Patent is:

1. In combination with an apparatus for laying aside types provided with slots on rules, small plates forming a continued knife in their stillstand position, a lever pivoting about the upper end of a hollow axle supporting two guiding plates, a bar extending through the hollow axle and supporting on its lower end another lever connected to a key by a bar.

2. In combination with an apparatus for laying aside types provided with slots on rules, small plates forming a continued knife in their still-stand position, a lever pivoting about the upper end of a hollow axle supporting two guiding plates, the first one straight and placed in the direction of the knife, the second one curved and adjustable by a spring and a screw.

3. In combination with an apparatus for laying aside types provided with slots on rules, small plates forming a continued knife in their still-stand position, a lever pivoting about the upper end of a hollow axle supporting two guiding plates and a separate plate guiding the types to their deposit.

4. In apparatus of the class described, in combination, a rule; slotted type adapted to ride on said rule; separate rectilinear parts of said rule being movable; keys for moving said rectilinear rule parts to outer position, and replacing them by curved parts for guiding the type to the points where they are to be collected.

In testimony whereof, I have signed my name to this specification.

OREST PUSINO.